United States Patent
Haas et al.

(10) Patent No.: US 6,912,387 B2
(45) Date of Patent: Jun. 28, 2005

(54) METHOD AND APPARATUS FOR INCORPORATING PAGER FUNCTIONALITY INTO A LAND MOBILE RADIO SYSTEM

(75) Inventors: Kevin L. Haas, Bartlett, IL (US); David Andrew Chrest, Huntley, IL (US); James Cunningham, Lake In The Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 538 days.

(21) Appl. No.: 10/027,189

(22) Filed: Dec. 20, 2001

(65) Prior Publication Data

US 2003/0119498 A1 Jun. 26, 2003

(51) Int. Cl.[7] .............................. H04Q 7/20; H04Q 7/00; H04M 3/42
(52) U.S. Cl. .................. 455/426.1; 455/414.2; 455/458; 455/515; 455/518; 340/7.1; 340/7.46
(58) Field of Search .............................. 455/422.1, 424, 455/425, 426.1, 416, 435.1, 458, 463, 560, 414.2, 414.4, 418–420, 515, 518–519; 340/286.14, 287, 7.1, 7.24, 7.46, 7.51, 7.52

(56) References Cited

U.S. PATENT DOCUMENTS

| 5,475,689 A | * | 12/1995 | Kay et al. .................... 370/337 |
| 5,884,188 A | * | 3/1999 | Hayes, Jr. ................ 455/552.1 |
| 5,940,756 A | * | 8/1999 | Sibecas et al. ........... 455/426.1 |
| 6,249,675 B1 | | 6/2001 | Bruno et al. |
| 6,278,697 B1 | * | 8/2001 | Brody et al. ................ 370/310 |
| 2001/0056354 A1 | * | 12/2001 | Feit et al. ...................... 705/1 |

* cited by examiner

Primary Examiner—William Trost
Assistant Examiner—Meless Zewdu
(74) Attorney, Agent, or Firm—Steven R. Santema; Indira Saladi

(57) ABSTRACT

A land mobile radio system receives paging messages communicated via a paging service communication protocol, decodes the paging messages to identify respective target recipients of the paging messages and determines whether the target recipients are members of a user group. If a target recipient is a member of the user group, a communication unit (e.g., radio or console) of the target recipient is identified, the message is converted to an appropriate protocol (e.g., a wireless protocol) and sent to the communication unit.

9 Claims, 3 Drawing Sheets

METHOD AND APPARATUS FOR INCORPORATING PAGER FUNCTIONALITY INTO A LAND MOBILE RADIO SYSTEM

FIELD OF THE INVENTION

This invention relates generally to communication systems and, more particularly, to a land mobile radio communication system incorporating pager functionality.

BACKGROUND OF THE INVENTION

Communication systems, including paging systems, cellular telephony systems and land mobile radio systems (also known as two-way radio systems), are well known. In recent years, the worlds of cellular and land mobile radio have converged such that a land mobile subscriber, utilizing a two-way radio, may communicate with a cellular subscriber. Thus, the land mobile subscriber is unencumbered from the need to carry both a cellular phone and the two-way radio. Presently, however, there is no similar convergence of land mobile radio and external paging systems, i.e., that can be accessed by the public switched telephone network (PSTN). Consequently, land mobile subscribers that desire to receive external pages must carry a separate pager. It would be desirable for land mobile subscribers to receive external pages on their two-way radio without carrying a separate pager. More generally, it would be desirable for subscribers having devices operable to communicate via a first wireless protocol to receive message that are originated using a second protocol.

Accordingly, there is a need for a method and apparatus that incorporates pager functionality into a land mobile radio system, or generally that enables a user to receive, on a device (e.g., two-way radio) adapted to communicate using a first wireless protocol, messages that are originated from a second wireless protocol such as a paging service protocol. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
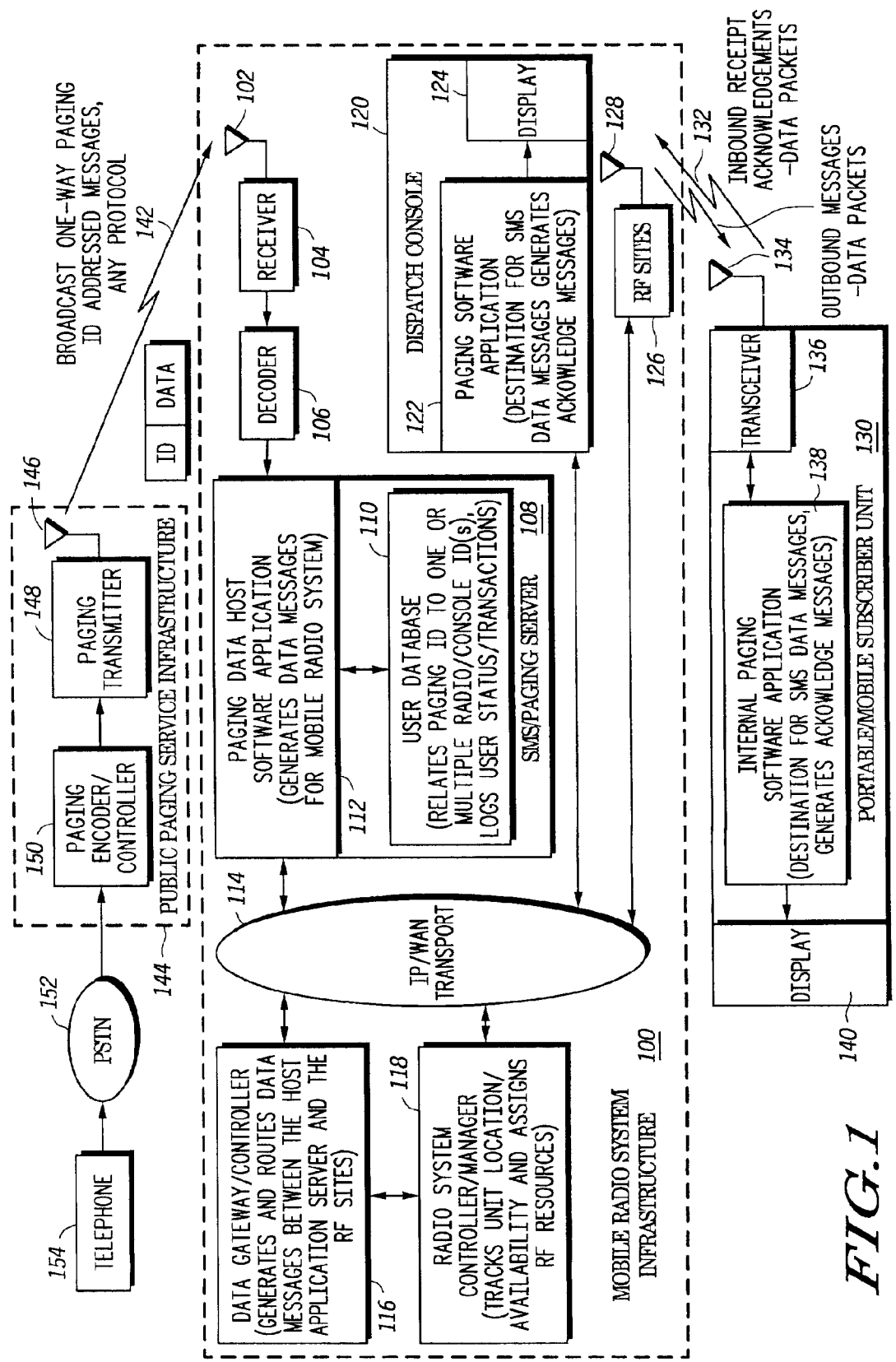
FIG. 1 is a block diagram of a land mobile radio communication system incorporating pager functionality according to the present invention.

Turning now to the drawings and referring initially to FIG. 1, there is shown a land mobile radio communication system 100 that incorporates pager functionality. The communication system 100 includes an antenna 102 and receiver 104 for receiving a paging signal 142 from a paging service infrastructure 144. The paging service infrastructure 144 includes a corresponding antenna 146 and paging transmitter 148 to send the paging signal 142 over the air. Generally, the paging signal 142 encodes packet data representative of paging messages. The packets typically include a header that identifies the target of the paging message, such as a target pager ID, and a data field that includes the paging message content. The specific format of the packets depend on the particular paging service protocol employed by the paging service infrastructure 144. Examples of paging service protocols include FLEX™, FLEX™-TD, Post Office Standardization Advisory Group (POCSAG) and ⅔-Tone. FLEX is a trademark of Motorola, Inc. ⅔-Tone is used in analog Fire Paging applications.

The paging messages are generated by a paging encoder/controller 150 of the paging service infrastructure 144 that is connected to the PSTN 152. The paging encoder/controller 150 receives, via the PSTN, paging information comprising text, voice or data. As shown, the paging information is communicated to the PSTN 152 from a telephone 154. Usually, in such case, voice information from the telephone is communicated to a live operator who keys in the text of the page, and the text information is communicated to the paging service infrastructure via the PSTN 152. The paging encoder/controller, in turn, converts the text information to the appropriate packet format of the paging service infrastructure. As will be appreciated, paging messages might also originate from two-way pagers, personal computers or generally any device that is operable to communicate with the PSTN or paging service infrastructure 144.

Upon receiving the paging signal 142, the receiver 104 demodulates the paging signal, yielding a demodulated paging signal. In one embodiment, demodulation is accomplished by using a four level frequency shift keying (FSK) demodulator. Alternatively or additionally, multi-level FM (i.e., C4FM) demodulation may be used. The demodulated paging signal (now in the packet format of the paging service infrastructure) is sent to a decoder 106 that recover the target pager ID and message content from the paging signal. This information is sent to a paging server 108 implementing a paging data host software application 112, which operates to convert the information to a format suitable for the radio system infrastructure 100.

The paging server 108 also includes a user database 110 that identifies pager IDs corresponding to radio IDs for users of the radio system. That is, certain subscribers of the radio system, having two-way radios with associated radio IDs, may also possess pager(s) with associated pager IDs. The database 110 maps these pager IDs to the appropriate subscriber and the subscriber's radio ID so that, in the event the radio system 100 receives a paging signal that is targeted to a pager ID in the database (and hence targeted to a subscriber), the radio system 100 can reformat the paging message into the format of the radio system 100 and send it to the subscriber's radio. In such manner, the subscriber can receive external pages when logged on to the radio system 100 without carrying (or without turning on) their pager. In one embodiment, the database 110 also logs paging messages and/or user status/transactions for later retrieval.

In the preferred embodiment, the radio system infrastructure 100 employs standard mobile internet protocol (IP) packet format wherein data that is to be transported between endpoints (or "hosts" in IP terminology) is divided into IP packets called datagrams. The datagrams include addressing information (e.g., source and destination addresses) that enables various routers forming an IP/WAN transport (or "packet network") 114 to route the packets to the specified addresses, which may identify a particular host or may comprise an IP multicast address shared by a group of hosts. Generally, the hosts or endpoints of the radio system infrastructure 100 comprise any device that may be a source or recipient of data communicated within the radio system infrastructure 100. As shown, these devices include a data gateway/controller 116, radio system controller/manager 118, dispatch console 120 and various radio frequency (RF) sites 126 (one shown).

The data gateway controller 116 generates and routes IP packets between the host application 112 and the RF sites 126. The radio system controller/manager 118, using known mobility management and resource assignment methods, determines the location of various subscriber units (e.g., mobile or portable two-way radio units) distributed among the RF sites 126 and, depending on availability of RF resources at those sites, assigns the necessary RF resources to support communication between the subscribers and the infrastructure 100. As shown, RF site 126 is using RF resources 132 to communicate packets to, and receive acknowledgments from, communication unit (or "subscriber unit") 130.

The subscriber unit 130 includes an antenna 134 and transceiver 136 for exchanging messages with the radio system infrastructure 100. The subscriber unit further includes an internal paging software application 138 that is the destination for Short Message Service (SMS) data messages specific to the paging service and generates acknowledgements for messages received from the RF sites 126; and a display 140 for displaying the messages. The dispatch console 120 similarly includes an internal paging software application 122 that is the destination for SMS data messages and generates acknowledgements for messages; and a display 124 for displaying messages and other data.

Figure 2:
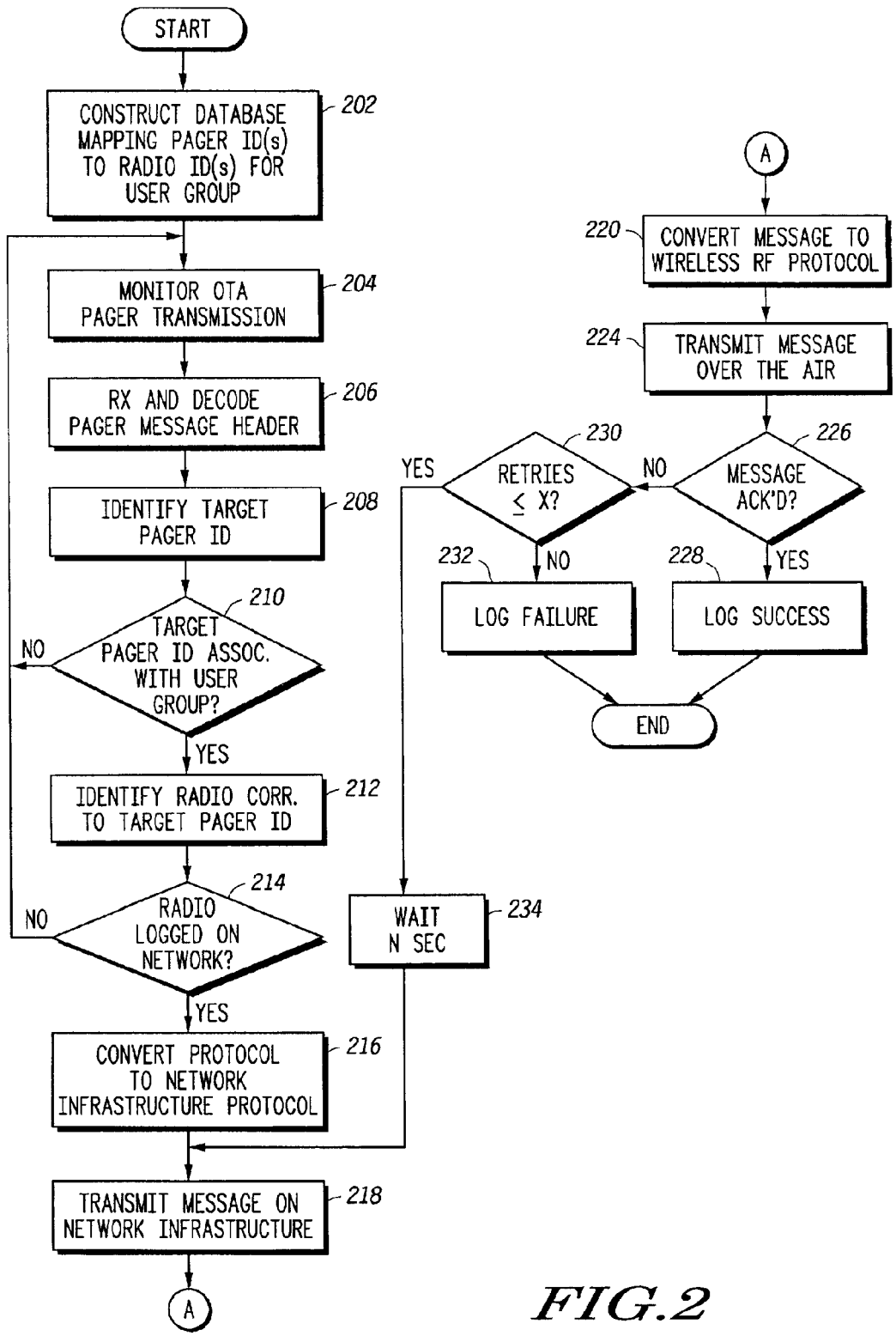
FIG. 2 is a flowchart showing a method that enables subscribers of a land mobile radio system to receive paging messages from an external paging service according to the invention.

Turning now to FIG. 2, there is shown a method that enables radio system subscribers to receive paging messages from an external paging service according to the invention. The steps of FIG. 2 are implemented, where applicable, using stored software routines within devices of the radio system infrastructure 100. These devices include respective processors (which may comprise, for example, microprocessors, microcontrollers, digital signal processors or combination of such devices) and memory (which may comprise, for example, volatile or nonvolatile digital storage devices or combination of such devices).

At step 202, the database 110 mapping pager IDs to radio IDs for radio system subscribers is constructed and stored in the paging server 108. The radio system subscribers may be organized into one or more user groups, as is known in the art. As has been described in relation to FIG. 1, the database 110 maps pager IDs associated with certain subscribers (or user group) to the user's radio ID so that, if a paging signal is received that is targeted to a pager ID in the database, the radio system 100 can reformat the paging message and send it to the subscriber radio(s) corresponding to the target pager ID.

At step 204, the infrastructure 100 monitors over-the-air (OTA) pager transmissions or, stated differently, receives pager transmissions from an external paging service via antenna 102. Generally, the pager transmissions will be formatted according to an external paging service protocol such as, for example, FLEX-TD, FLEX or POCSAG. At step 206, the receiver 104 and decoder 106, respectively, receive and decode the pager transmissions to recover a pager message header.

At step 208, the decoder 106 recovers a target pager ID from the pager message header. The target pager ID identifies a target recipient device (i.e., pager) for the message, which recipient device may or may not be one of the pager IDs identified in a database 110. At step 210, the paging server 108 consults the database 110 to determine whether the target pager ID corresponds to a member of the user group. That is, the paging server determines whether the target pager ID matches any of the pager IDs identified in the database 110. If there is a match, the paging server determines that the member associated with the target pager ID is a targeted recipient of the message.

If the target recipient is a member of the user group, the process proceeds to step 212 where the paging server 108 identifies a communication unit associated with the target recipient corresponding to the target pager ID. The communication unit associated with the target recipient may comprise, for example, a radio or console. Otherwise, if the target pager ID does not match any of the pager IDs of the user group, the process returns to step 204 to monitor further pager transmissions.

If the target recipient is a member of the user group and a corresponding communication unit (e.g., radio) has been identified at step 212, the paging server 108 determines at step 214 whether the radio is logged on to the network 100, or generally whether the identified radio is "active" and is operable to receive messages communicated via the radio network 100. If the radio is logged on the network and able to receive messages communicated via the radio network 100, the paging server 108 converts the paging message at step 216 to a format suitable for the radio system infrastructure 100. If the radio is not logged on the network 100 and is therefore unable to receive messages communicated via the radio network, the process returns to step 204 to monitor further pager transmissions.

In one embodiment, the paging message is converted to IP packet format at step 216 by the paging data host software application 112 and handed off to the data gateway/controller 116. The gateway/controller 116 performs mobility and routing functions, as well as conversion to radio IP message format for the target radio. As will be appreciated, multiple paging messages can be generated from a single over-the-air page, with relationships set up as desired in the paging host application. Thus, for example, a page to a member of a user group may be transmitted to all of the members of the user group, rather than the individual member corresponding to the target pager ID.

At step 218, the paging message(s) (in the form of IP packets) are transported by the network infrastructure to various endpoints appropriate for the paging message. For example, with reference to FIG. 1, the IP packets may be transported by IP/WAN transport 114 to the data gateway/controller 116, radio system controller/manager 118, dispatch console 120 and to an RF site 126 associated with an identified target radio 130.

At step 220, the paging messages are converted from IP packet format to a wireless protocol suitable for transmission to the target radio 130. In one embodiment, this is accomplished by the RF site 126 that is in communication with the target radio 130. The converted messages is then transmitted at step 224 over the air to the target radio 130, via RF resources 132.

If the target radio 130 acknowledges the converted message (determined at step 226), the message transfer is determined to be a success and, at step 228, the success is logged by the paging server 108. In one embodiment, if the message is not acknowledged, the RF site retries sending the message until a predetermined retry threshold "X" is met. If the number of retries is less than or equal to the retry threshold (determined at step 230), the process proceeds to step 234 where the RF site waits a predetermined time ("N seconds") and then retransmits the message at step 218. If the number of retries is greater than the retry threshold, the message transfer is determined to be a failure and, at step 232, the failure is logged by the paging server 108. It is noted that any retries accomplished at step 218 are at the application layer and separate from any common air interface (CAI) retries.

Figure 3:
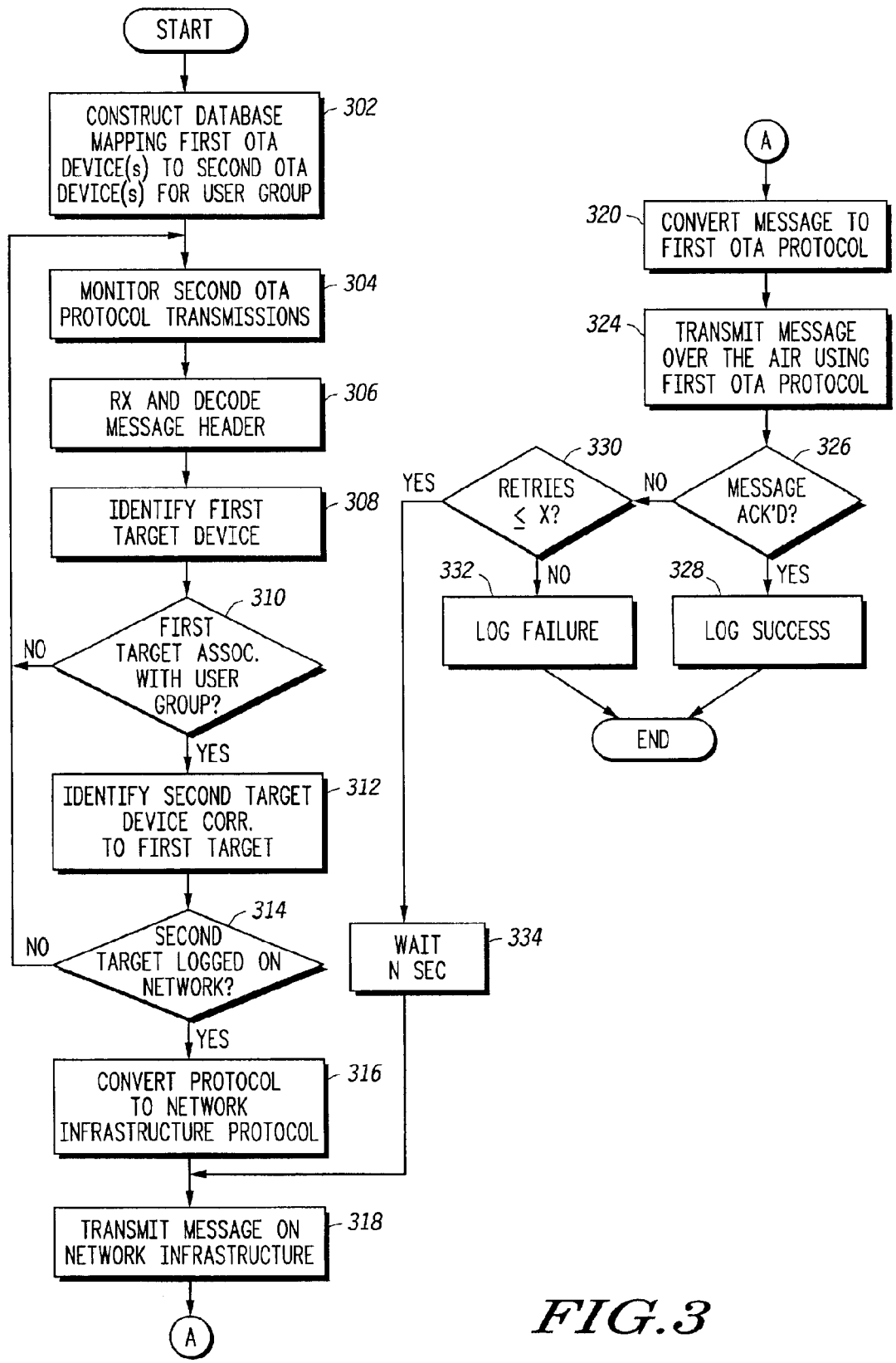
FIG. 3 is a generalized flowchart showing a method for subscribers implementing a first wireless communication protocol to receive messages communicated via a second wireless communication protocol according to the invention.

FIG. 3 is a generalized flowchart showing a method for subscribers implementing a first wireless communication protocol to receive messages communicated via a second wireless communication protocol according to the invention. The steps of FIG. 3 are implemented, where applicable, using stored software routines within communication infrastructure devices associated with the subscribers implementing the first wireless protocol.

At step 302, a database is constructed mapping subscriber device IDs implementing a first wireless protocol ("first OTA devices") to IDs mapping a second wireless protocol ("second OTA devices"). The first OTA devices may be organized into one or more user groups, as is known in the art. In one embodiment, the first OTA devices comprise radio units implementing a radio system protocol and the second OTA devices comprise pager devices implementing a paging service protocol, substantially as described in relation to FIG. 2. As will be appreciated, however, the first and second OTA devices may represent generally any types of devices implementing different wireless protocols.

At step 304, the infrastructure monitors over-the-air (OTA) transmissions of the second protocol ("second OTA protocol transmissions"). At step 306, the infrastructure receives and decodes the second OTA protocol transmissions to recover a message header. At step 308, a target recipient device ("first target device") is identified from the message header. The first target device may correspond, for example, to a target device ID identified in the message header. The target recipient device may or may not map to any of the second OTA devices identified in the database.

At step 310, the database is consulted to determine whether the first target corresponds to a member of the user group implementing the first OTA protocol. If so, the process proceeds to step 312 to identify a second target device, implementing the first OTA protocol. For example, the first target may comprise a pager implementing a paging service protocol and the second target a radio unit implementing a radio system protocol. If the first target is not associated with the user group implementing the radio system protocol, the process returns to step 304 to monitor further transmissions of the paging service protocol.

If the first target (e.g., pager) is associated with the user group and a second target (e.g., radio) has been identified at step 312, it is determined at step 314 whether the second target is logged on to its associated infrastructure, or generally whether the second target is "active" and is operable to receive messages communicated via the first OTA protocol. If so, the message is converted at step 316 to a format (e.g., IP packet format) suitable for the infrastructure. At step 318, the message is transported by the network infrastructure to various endpoints which, in one embodiment, include at least one RF site (e.g., RF site 126, FIG. 1) adapted for wirelessly communicating with the second target via the first OTA protocol. At step 320, the RF site converts the message from the infrastructure format to the first OTA protocol and, at step 324, sends the converted message to the second target using the first OTA protocol.

If the second target acknowledges the converted message (determined at step 326), the message transfer is determined to be a success and, at step 328, the success is logged by the infrastructure. In one embodiment, if the message is not acknowledged, the RF site retries sending the message until a predetermined retry threshold "X" is met. If the number of retries is less than or equal to the retry threshold (determined at step 330), the process proceeds to step 334 where the RF site waits a predetermined time ("N seconds") and then retransmits the message at step 318. If the number of retries is greater than the retry threshold, the message transfer is determined to be a failure and, at step 332, the failure is logged by the infrastructure. It is noted that any retries accomplished at step 318 are at the application layer and separate from any common air interface (CAI) retries.

The present disclosure has identified methods for land mobile subscribers (or console operators) to receive external pages on their two-way radio (or console) without carrying a separate pager, or generally for subscribers having devices operable to communicate via a first wireless protocol to receive message that are originated using a second protocol. The methods, however, do not preclude the subscribers from receiving the pages on their pager if they so desire. Subscribers that wish to carry a separate pager in addition to their radio will continue to receive pages via their pager, even though they will receive the same messages on their radio while logged on to the radio network. Multiple paging messages can be generated from a single over-the-air page, with relationships set up as desired in the paging host application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a radio communication system including a plurality of subscribes defining a user group, the subscribers having wireless subscriber units operable to receive messages communicated via a first wireless communication protocol, a method comprising:
   constructing a database mapping one or more members of the user group with pager IDs and subscriber units;
   receiving a paging message communicated via a service protocol;
   decoding a header of the paging message to identify a target pager ID;
   determining a target recipient to be an individual associated with the target pager ID by consulting the database to determine whether the target pager ID corresponds to a member of the user group if the target pager ID corresponds to a member of the user group, identifying the member as the target recipient, thereby determining that the target recipient is a member of the user group;
   if the target recipient is a member of the user group,
      identifying a subscriber unit associated with the target recipient; and
      if the subscriber unit is logged on the radio communication system, sending the paging message to die subscriber unit via the first wireless communication protocol.

2. The method of claim 1, performed by one or more infrastructure devices of the radio communication system.

3. The method of claim 1, wherein the paging service protocol comprises one of: FLEX-TD, FLEX and POCSAG.

4. The method of claim 1, wherein the step of identifying a subscriber unit associated with the target recipient comprises, upon determining that the target pager ID corresponds to a member of the user group, consulting the database to identify the subscriber unit corresponding to the target pager ID.

5. In a radio communication system including a plurality of users defining a user group, a method comprising:

constructing a database mapping one or more members of the user group with respective pager IDs and communication units;

receiving a paging message communicated via a paging service communication protocol;

determining a target recipient of the paging message by consulting the database to determine whether the target recipient identified by a target pager ID corresponds to a member of the user group and If the target pager ID corresponds to a member of the user group, identifying the member as the target recipient, thereby determining that the target recipient is a member of the user group;

if the target recipient is a member of the user group,
identifying a communication unit associated with the target recipient, the communication unit being operable to receive messages communicated via a wireless protocol other than the paging service communication protocol; and if the communication unit is logged on the radio communication system, converting the paging message to the wireless protocol, yielding a converted message, and sending the converted message to the communication unit.

6. The method of claim 5, performed by one or more infrastructure devices of the radio communication system.

7. The method of claim 5, wherein the paging service protocol comprises one of: FLEX-TD, FLEX and POCSAG.

8. The method of claim 5, wherein the step of identifying a communication unit associated with the target recipient comprises consulting the database to identify the communication unit of the target recipient.

9. A radio communication system comprising:

a database for mapping one or more members of a user group with respective pager IDs and subscriber units;

a receiver operable to receive paging messages communicated via a paging service communication protocol;

a decoder operable to decode the paging messages to identify respective target recipients of the paging messages;

a paging server for determining whether the target recipients are members of the user group by consulting the database and, if a target recipient is a member of the user group, identifying a communication unit associated with the target recipient;

a controller for converting the paging message to a wireless protocol of the communication unit, yielding a converted message; and a transmitter for sending the converted message to the communication unit associated with the target recipient.

* * * * *

UNITED STATES PATENT AND TRADEMARK OFFICE
CERTIFICATE OF CORRECTION

PATENT NO. : 6,912,387 B2
DATED : June 28, 2005
INVENTOR(S) : Haas et al.

It is certified that error appears in the above-identified patent and that said Letters Patent is hereby corrected as shown below:

<u>Column 6,</u>
Line 46, change "via a" to -- via a paging --.
Line 53, change "user group" to -- user group and --.
Line 61, change "dic" to -- the --.

<u>Column 7,</u>
Line 17, change "If" to -- if --.

Signed and Sealed this

Sixteenth Day of May, 2006

JON W. DUDAS
*Director of the United States Patent and Trademark Office*